Oct. 27, 1964 S. W. ATTWOOD 3,154,741
PHASE-ERROR CANCELLATION HETERODYNE RECEIVER
Filed June 26, 1961
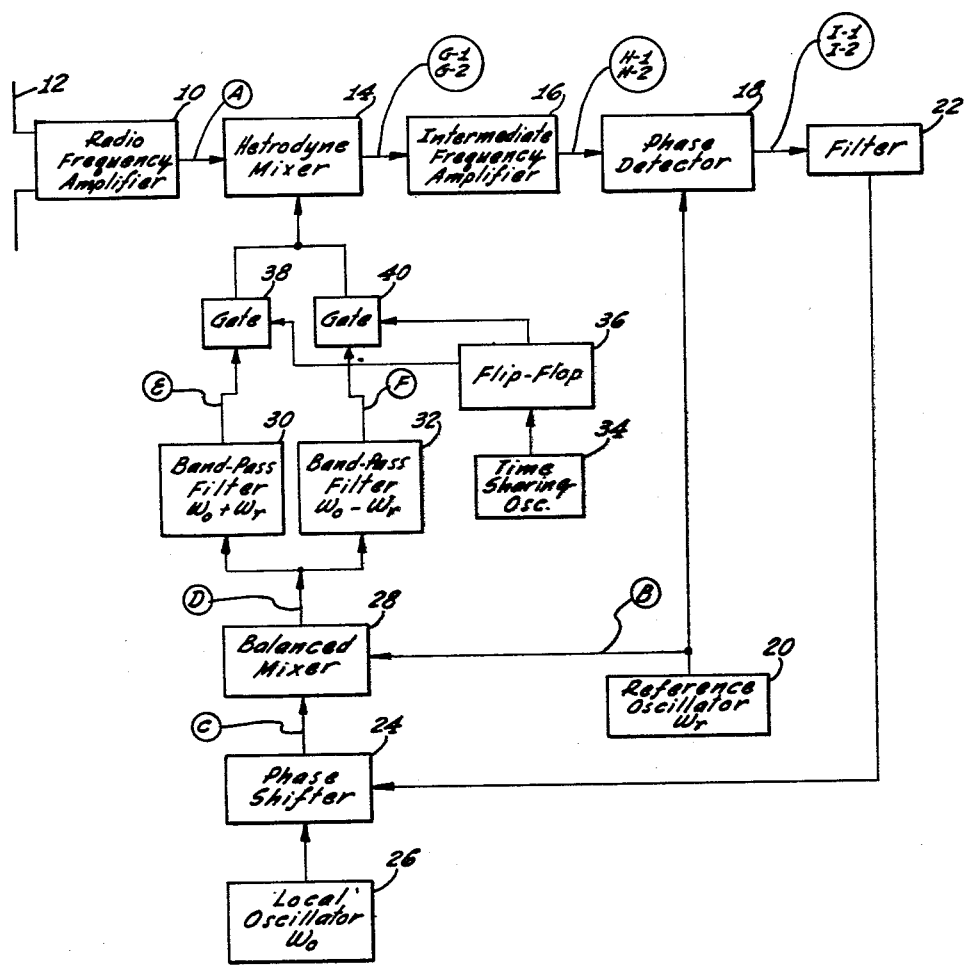
INVENTOR:
Stanley W. Attwood

United States Patent Office 3,154,741
Patented Oct. 27, 1964

3,154,741
PHASE-ERROR CANCELLATION HETERODYNE
RECEIVER
Stanley W. Attwood, Scottsdale, Ariz., assignor to Motorola, Inc., Chicago, Ill., a corporation of Illinois
Filed June 26, 1961, Ser. No. 119,678
5 Claims. (Cl. 325—363)

The present invention relates to heterodyne receivers, and the invention is principally concerned with the type of heterodyne receiver used to measure the phase displacements between received signals and a given reference signal.

The invention relates more particularly to an improved phase-error cancellation system for use in a phase-measuring heterodyne receiver to cancel any extraneous phase delays which are usually encountered in the intermediate frequency amplifier of the receiver, and which tend to introduce errors in the phase measurement and response of the receiver.

The inherent phase delays normally present in a superheterodyne receiver are usually unimportant when the receiver is used for communication purposes. However, in receivers used, for example, for navigational purposes, or in laboratory phase measurement equipment, in which phase displacements must be precisely measured, these inherent phase delays in the receiver circuitry are most important as they can critically affect the desired measurements.

An object of the present invention is to provide an improved heterodyne receiver in which phase delays and phase drifts in the receiver circuitry are effectively eliminated.

A more general object of the invention is to provide such an improved heterodyne receiver which is capable of measuring phase displacements between an incoming signal and a given reference signal with a high degree of precision.

Another object of the invention is to provide an improved phase drift cancellation system for use, for example, in a heterodyne receiver which requires one or more intermediate frequency amplifier stages, and which is used for navigational or other purposes.

Yet another object is to provide a system which is effective to eliminate circuit instability in a heterodyne receiver, when such a receiver is used for the measurement of the phase of a signal received thereby.

A feature of the invention is the provision of a heterodyne receiver in which the heterodyne mixer of the receiver is excited in alternation and on a time-shared basis by the upper and lower side bands of a pair of locally generated signals, so as to remove in a manner to be described circuit instabilities in the measurement of the phase of a signal received by the receiver.

Another feature of the invention is the provision in a phase-measuring heterodyne receiver including a first detector and a phase detector, of a phase-error cancellation system for eliminating phase delays and phase variations in the receiver between the first detector and the phase detector.

Other objects and advantages of the invention will become apparent from a consideration of the following specification, when the specification is taken in conjunction with the accompanying drawing. In the accompanying drawing, the single figure shows an embodiment of the improved phase-error cancellation system of the invention as incorporated into a drone or slave type of receiver in which the local heterodyne oscillator is caused to track the phase of the received signal.

The receiver of the figure includes, for example, a radio frequency amplifier 10 having a suitable antenna 12 connected to its input circuitry. The radio frequency amplifier 10 and antenna 12 are used, of course, only when the signals to be introduced to the receiver are derived by radiation from a distant point.

The output circuitry of the radio frequency amplifier 10 is coupled to a heterodyne mixer 14. The heterodyne mixer, in turn, is coupled to an intermediate frequency amplifier 16 of one or more stages. The output from the intermediate frequency amplifier 16 is introduced to a phase detector 18.

The phase detector 18 serves to compare the phase of the signal derived from the intermediate frequency amplifier 16 with the phase of a signal derived from a reference oscillator 20. The resulting output signal produced by the phase detector 18 is indicative of any phase displacements between its two input signals. This output signal is passed through a filter 22 to an appropriate phase shifter network 24 in the illustrated receiver.

The phase shifter network 24 serves to control the phase of the output signal of a local oscillator 26. This output signal is passed through a balanced mixer 28 to a pair of band pass filters 30 and 32. The output signal from the reference oscillator 20 is also introduced to the balanced mixer 28.

A time sharing oscillator 34 which may, for example, be any appropriate free-running relaxation oscillator, is coupled to a flip-flop 36. The flip-flop 36 is a usual bistable multivibrator, and it is triggered between its two stable states by successive output pulses from the oscillator 34.

The filters 30 and 32 are coupled to the heterodyne mixer 14 through respective ones of a pair of gates 38 and 40. These gates are controlled by the flip-flop 36, and the control is such that one or the other of the gates 38 and 40 is opened at any one time. This permits the output signals from the filters 30 and 32 to be alternately introduced to the heterodyne mixer 14, and on a time-shared basis.

The various components of the receiver shown in the figure are extremely well known to the art. Moreover, the manner in which these components may be coupled together to form the illustrated combination are also well known to the art. Since the internal circuitry of the components forms no part of the present invention, it is deemed unnecessary to describe such circuitry in detail herein. In fact, it is believed that the principles upon which the present invention is predicated, may best and more clearly be described and taught, without cumbering the record with unnecessary circuitry.

The incoming signal introduced to the heterodyne mixer 14 can be represented by:

$$e_i = \sin(\omega_i t + \theta_i) \tag{A}$$

where:

$\theta_i$ is the phase displacement of the incoming signal from a given reference;
$e_i$ is the instantaneous amplitude of the received signal.

The signal generated by the reference oscillator 20 can be represented by:

$$e_r = \cos(\omega_r t + \beta) \tag{B}$$

where $\beta$ is the phase displacement of the reference signal from the given reference.

The signal generated by the local oscillator 26, after passage through the phase shifter 24, can be represented by:

$$e_o = \cos(\omega_o t + \alpha) \tag{C}$$

where $\alpha$ is the phase displacement of the local oscillator signal from the given reference.

Now, if the frequency of the local oscillator signal ($\omega_o$) is greater than the frequency of the reference oscillator signal ($\omega_r$), the signal at the output of the balanced mixer 28 is:

$$e_d = K_a \{\cos[(\omega_o+\omega_r)t + \alpha+\beta] + \cos[\omega_o-\omega_r)t+\alpha-\beta]\} \quad (D)$$

The band pass filter 30 is constructed to pass only the upper side band of the signal (D), namely:

$$e_e = K_a \cos[(\omega_o+\omega_r)t+\alpha+\beta] \quad (E)$$

The band pass filter 32 is constructed to pass only the lower side band of the signal (D), namely:

$$e_f = K_a \cos[(\omega_o-\omega_r)t+\alpha-\beta] \quad (F)$$

When the gate 38 is activated, only the upper side band (E) of the signal from the band pass filter 30 is passed to the mixer 14, and the resulting output signal from the mixer (assuming that only the lower frequency components are passed to the intermediate frequency amplifier 16) is:

$$e_a = -K_a \sin[(\omega_o+\omega_r-\omega_i)t+(\alpha+\beta-\theta_i)] \quad (G-1)$$

This results in an output signal from the intermediate frequency amplifier 16, which may be represented as follows:

$$e_b = -K_b \sin[(\omega_o+\omega_r-\omega_i)t + (\alpha+\beta-\theta_i+\epsilon)] \quad (H-1)$$

where $\epsilon$ is the phase error introduced by the intermediate frequency amplifier.

For proper phase detector action by the phase detector 18, the frequency of the signal introduced to it by the intermediate frequency amplifier 16 must be the same as the frequency ($\omega_r$) of the reference signal introduced to it by the reference oscillator 20. That is, the frequency ($\omega_o+\omega_r-\omega_i$) must equal $\omega_r$. Therefore, the frequency of the local oscillator signal ($\omega_o$) must be the same as that of the received signal ($\omega_i$).

Now, since ($\omega_o+\omega_r-\omega_i$) must be equal to $\omega_r$, the output $e_c$ of the phase detector 18 is:

$$e_c = K_c \{\sin[(\omega_o+\omega_r-\omega_i)t+(\alpha+\beta-\theta_i+\epsilon)] - \sin[\omega_r t+\beta]\}$$

$$= -K_c \sin(\alpha+\epsilon-\theta_i) \quad (I-1)$$

$$= -K_c(\alpha+\epsilon-\theta_i) \text{ for small displacements.}$$

The phase shifter 24 will adjust the phase $\alpha$ until it is equal to ($\theta-\epsilon$), rather than until it is equal to $\theta$, as is desired.

Now, when the gate 40 is activated, only the lower side band of the signal (F) from the band pass filter 32 is passed to the mixer 14, and the resulting output signal from the mixer is:

$$e_a = K_a \sin[\omega_i-\omega_o+\omega_r)t+(\theta-\alpha+\beta)] \quad (G-2)$$

And the output from the intermediate frequency amplifier 16 is:

$$e_b = K_b \sin[\omega_i-\omega_o+\omega_r)t+(\theta_i-\alpha+\beta+\epsilon)] \quad (H-2)$$

and the output from the phase detector 18 is:

$$e_c = K_c \sin(\theta_i-\alpha+\epsilon)$$
$$= K_c(\theta_i-\alpha+\epsilon) \text{ for small displacements} \quad (I-2)$$

Therefore, since the upper and lower side bands are time-shared by the action of the gates 38 and 40, and if this time sharing is at a rate high compared with the loop time constants, the control signal at the output of the phase detector 18 may be represented as:

$$e_c = \frac{1}{2}[-K_c(\alpha+\epsilon-\theta_i) + K_c(\theta_i-\alpha+\epsilon)]$$
$$= K_c(\theta_i-\alpha)$$

This means that the resulting control signal $e_c$ is independent of the phase drift $\epsilon$, and the phase displacement $\alpha$ imparted by the phase shifter 24 is made precisely equal to the phase displacement $\theta_i$ of the incoming signal, as is desired. Also, the control signal $e_c$ is independent of the frequency or phase of the reference signal which also tends to a high degree of stability.

The invention provides, therefore, an improved heterodyne receiver which is eminently suited for phase measurement purposes, and which is capable of measuring precisely the phase displacement of a received signal from a given reference, such measurement being independent of any phase drifts or instability in the circuit of the receiver itself.

What is claimed is:

1. A heterodyne receiver including in combination, a heterodyne mixer, an intermediate frequency amplifier coupled to said heterodyne mixer for amplifying the resulting intermediate frequency signal, and phase detection means coupled to said intermediate frequency amplifier, a local oscillator for generating local oscillations, a reference oscillator coupled to said phase detection means, said phase detection means being responsive to the combined inputs from said intermediate frequency amplifier and said reference oscillator, phase shifter means coupled to said local oscillator and to said phase detection means and responsive to said phase detection means to produce a phase shift of the oscillations from said local oscillator, mixer circuit means coupled to said phase shifter and to said reference oscillator and responsive to said reference signal and to said oscillations for producing a heterodyning signal having an upper side band and a lower side band, and control means coupled to said mixer circuit means for alternately introducing said upper side band and said lower side band of said heterodyning signal to the heterodyne mixer on a time shared basis, said phase detection means, said phase shifter means, said mixer circuit means, said control means, said heterodyne mixer and said intermediate frequency amplifier forming a closed phase loop having a predetermined time constant, said control means alternately introducing said upper and lower side bands to said heterodyne mixer at a rate high compared with the time constant of said phase loop.

2. The combination defined in claim 1, and in which said local oscillator is constructed so that the frequency of said local oscillations is the same as the frequency of the received signal.

3. A heterodyne receiver including in combination, a heterodyne mixer, an intermediate frequency amplifier coupled to said heterodyne mixer for amplifying the resulting intermediate frequency signal, and phase detection means coupled to said intermediate frequency amplifier, a local oscillator for generating local oscillations, a reference oscillator coupled to said phase detection means, said phase detection means being responsive to the combined inputs from said intermediate frequency amplifier and said reference oscillator, phase shifter means coupled to said local oscillator and to said phase detection means and responsive to said phase detection means to produce a phase shift of the oscillations from said local oscillator, mixer circuit means coupled to said phase shifter and to said reference oscillator and responsive to said reference signal and to said oscillations for producing a heterodyning signal having an upper side band and a lower side band, first and second band pass filter means coupled to said mixer circuit means, said first band pass filter means being responsive to said upper side band and said second band pass filter means being responsive to said lower side band, first gate means connecting said first band pass filter means to said heterodyne mixer, second gate means connecting said second band pass filter means to said heterodyne mixer, switch means connected to said first and second gate means for alternately opening and closing the same, time sharing oscillator means connected to said switch means and controlling the same so that the rate at which said first and second gate means alternately open and close is controlled by the frequency of the oscillations from said time sharing oscillator, said first and second gate means alternately introducing said upper side band and said lower side band of said heterodyning signal to the heterodyne mixer on a time shared basis, said phase detection means, said phase shifter means, said mixer circuit means, said first and second band pass filter means, said first and second gate means, said heterodyne mixer and said intermediate frequency amplifier forming a closed phase loop having a predetermined time constant, said first and second gate means alternately introducing said upper and lower side bands to said heterodyne mixer at a rate high compared with the time constant of said phase loop.

4. In a heterodyne receiver for measuring the phase displacement of a received signal from a given reference signal, and which includes, a heterodyne mixer for heterodyning the received signal to a selected intermediate frequency signal, an intermediate frequency amplifier coupled to the heterodyne mixer for amplifying intermediate frequency signals, a phase detector coupled to the intermediate frequency amplifier, and a reference oscillator coupled to said phase detector for introducing a reference signal thereto; the combination including, a local oscillator for generating a local oscillator signal having substantially the same frequency as the received signal, mixer circuit means coupled to the said local oscillator and to the reference oscillator and responsive to the reference signal and to said local oscillator signal for producing a heterodyning signal having an upper side band and a lower side band, first band pass filter means coupled to said mixer circuit means for passing said upper side band, second band pass filter means coupled to said mixer circuit means for passing said lower side band, and control means including gate circuit means coupled to said first and second band pass filter means for alternately passing said upper side band and said lower side band from said first and second filter means to the heterodyne mixer during reception of signals by the heterodyne receiver, with the effect of phase error introduced by the intermediate frequency amplifier in said upper side band opposing the effect of phase error introduced by the intermediate frequency amplifier in said lower side band, said control means including gate signal generating means coupled to said gate circuit means for operating the same to alternately apply said upper and lower side bands to the heterodyne mixer at a rate sufficient to develop an output signal from the phase detector which is proportional to the phase displacement of the received signal from said local oscillator signal, and which is substantially independent of the phase error introduced by the intermediate frequency amplifier.

5. In a heterodyne receiver for measuring the phase displacement of a received signal from a given reference signal and which includes, a heterodyne mixer for heterodyning the received signal to a selected intermediate frequency signal, an intermediate frequency amplifier coupled to the hetrodyne mixer for amplifying the intermediate frequency signal, a phase detector coupled to the intermediate frequency amplifier, a reference oscillator coupled to said phase detector for introducing a reference signal thereto, and a local oscillator for generating a local oscillator signal, the combination of: a phase shifting network coupled to said local oscillator and to said phase detector, mixer circuit means coupled to said phase shifting network and said reference oscillator and responsive to said reference signal and to said local oscillator signal for producing a heterodyning signal for said received signal having an upper side band and a lower side band, first band pass filter means coupled to said mixer circuit means for passing said upper side band, second band pass filter means coupled to said mixer circuit means for passing said lower side band, and means including gate circuit means coupled to said first and second band pass filter means for alternately passing said upper side band and said lower side band to said heterodyne mixer during reception by said heterodyne receiver, at a rate sufficient to correct phase error introduced by said intermediate frequency amplifier, said phase shifting network being responsive to said phase detector output signal to cause the phase of said local oscillator signal to track the phase of the received signal.

References Cited in the file of this patent
UNITED STATES PATENTS

| | | |
|---|---|---|
| 2,460,900 | Newbold | Feb. 8, 1949 |
| 2,501,591 | Bach | Mar. 21, 1950 |
| 2,773,191 | Watkins | Dec. 4, 1956 |